(12) United States Patent
Cadek (10) Patent No.: US 10,107,443 B2
(45) Date of Patent: Oct. 23, 2018

(54) MICRO-DOMAIN CARBON MATERIAL FOR THERMAL INSULATION

(71) Applicant: Orion Engineered Carbons GmbH, Frankfurt am Main (DE)

(72) Inventor: Martin Cadek, Hanau-Kesselstadt (DE)

(73) Assignee: Orion Engineered Carbons GmbH, Frankfurt am Main (DE)

( * ) Notice: Subject to any disclaimer, the term of this patent is extended or adjusted under 35 U.S.C. 154(b) by 109 days.

(21) Appl. No.: 15/027,055

(22) PCT Filed: Oct. 4, 2013

(86) PCT No.: PCT/EP2013/070659
§ 371 (c)(1),
(2) Date: Apr. 4, 2016

(87) PCT Pub. No.: WO2015/049008
PCT Pub. Date: Apr. 9, 2015

(65) Prior Publication Data
US 2016/0238187 A1    Aug. 18, 2016

(51) Int. Cl.
| *F16L 59/00* | (2006.01) |
| *E04B 1/74* | (2006.01) |
| *C08J 9/00* | (2006.01) |
| *C08K 7/24* | (2006.01) |
| *C08K 3/04* | (2006.01) |
| *F16L 59/02* | (2006.01) |
| *C08J 9/228* | (2006.01) |
| *E04B 1/80* | (2006.01) |
| *C01B 32/18* | (2017.01) |

(52) U.S. Cl.
CPC .......... *F16L 59/028* (2013.01); *C08J 9/0071* (2013.01); *C08J 9/228* (2013.01); *C08K 3/04* (2013.01); *C08K 7/24* (2013.01); *C01B 32/18* (2017.08); *C08J 2201/03* (2013.01); *C08J 2323/12* (2013.01); *C08J 2325/06* (2013.01); *C08J 2325/08* (2013.01); *C08J 2375/04* (2013.01); *C08K 2201/004* (2013.01); *C08K 2201/005* (2013.01); *E04B 1/803* (2013.01); *E04B 2001/742* (2013.01)

(58) Field of Classification Search
CPC ........ F16L 59/028; C08J 9/0071; C08J 9/008; C08J 2325/04; C08J 2325/02; C08K 3/04; C08K 3/044; C08K 3/042; C08K 3/046; C08K 2201/004; C08K 2201/005; E04B 1/803; E04B 2001/742
See application file for complete search history.

(56) References Cited

U.S. PATENT DOCUMENTS 6,476,154 B1    11/2002 Maly et al.

FOREIGN PATENT DOCUMENTS

| CN | 101061554 A | 10/2007 |
| DE | 9305431 U | 8/1994 |
| EP | 620246 A1 | 10/1994 |
| JP | 63-183941 A | 7/1988 |
| WO | WO 96/34039 A1 | 10/1996 |
| WO | WO 97/45477 A1 | 12/1997 |
| WO | WO 98/42621 A1 | 10/1998 |
| WO | WO 2004/022636 A1 | 3/2004 |
| WO | 2006/052142 A1 | 5/2006 |
| WO | WO 2006/052142 * | 5/2006 |
| WO | WO 2006/061571 * | 6/2006 |
| WO | WO 2006/61571 A1 | 6/2006 |
| WO | 2011/042800 A1 | 4/2011 |
| WO | WO 2011/042800 * | 4/2011 |

OTHER PUBLICATIONS

International Search Report dated Jun. 18, 2014 for International Application No. PCT/EP2013/070659.

\* cited by examiner

*Primary Examiner* — C Melissa Koslow
(74) *Attorney, Agent, or Firm* — Knobbe, Martens, Olson & Bear, LLP (57) ABSTRACT

A method of thermally insulating makes use of a particulate carbon material including carbon particles in a shape of disks and hollow open cones. The hollow open cones can have one or several of the following opening angles: 19.2°, 38.9°, 60°, 83.6°, 112°. The thickness of the disks and the thickness of walls of the hollow open cones can each be less than 100 nm, and the longest dimensions of the disks and the hollow open cones can each be less than 5 μm.

14 Claims, 5 Drawing Sheets

ND CARBON MATERIAL FOR
THERMAL INSULATION

The present relates to the use of a particulate microstructured carbon material in thermal insulation applications, preferably as an athermanous filler.

BACKGROUND

Thermal insulation for saving energy has attained great prominence in the context of desire for sustainable development and the increasing cost of energy. Thermal insulation is gaining ever greater importance in the light of increasing energy prices, increasingly scarce resources, the desire for reducing $CO_2$ emissions, the necessity of a sustainable reduction in energy demand and also the increasingly demanding requirements which protection against heat and cold will have to meet in the future. These increasingly demanding requirements for optimizing thermal insulation apply equally in buildings, e.g. new buildings or existing buildings, and to thermal insulation in the mobile, logistics and stationary sectors.

Building materials such as steel, concrete, masonry and glass and also natural rock are relatively good thermal conductors so that the exterior walls of buildings made thereof very quickly give off heat from the inside to the outside in cold weather. Development is therefore aimed, firstly, at improving the insulation properties by increasing the porosity of these building materials as in the case of, for example, concrete and masonry, and secondly at cladding the outer walls with thermal insulation materials. The thermal insulation materials which are mostly used at present are materials having a low thermal conductivity. Materials used include both organic insulation materials and inorganic insulation materials, e.g. foamed plastics such as polystyrene, and polyurethane; wood fiber materials such as wood wool and cork; vegetable or animal fibers such as hemp, flax, wool; mineral and glass wool, foamed glass in plate form; calcium silicate boards and gypsum plasterboards. Those thermal insulation materials are mostly used in the form of foamed or pressed boards and moldings, alone or in combination with others. Another effective way to provide thermal insulation is the use of vacuum insulated panels (VIPs) which are based on the principle of vacuum insulation. Those VIPs comprise a porous core material to support the vacuum and surrounded by a highly gas-tight cover material. Materials that may be employed for the core include open-cell polymer foams, microfibre materials, fumed silica and perlite.

The insulating capability of each of the above-mentioned materials and vacuum/material combinations, respectively, can be further improved by adding an athermanous material capable of interacting with infrared radiation and thus reducing infrared transmission. For example, athermanous materials may be used as fillers in thermoinsulating polymeric foams and in vacuum insulated panels. Expandable thermoplastic polymers and among these, in particular, expandable polystyrene (EPS), are conventional insulation materials which have been known and used for a long time for preparing expanded articles which can be adopted in various applicative areas, among which, one of the most important is thermal insulation. The flat sheets of expanded polystyrene are normally used with a density of about 30 g/l as the thermal conductivity of the polymer has a minimum at these values. It is not advantageous to fall below this limit, even if this is technically possible, as it causes a drastic increase in the thermal conductivity of the sheet which must be compensated by an increase in its thickness. In order to avoid this drawback, the polymer can be filled with athermanous materials such as graphite (e.g. in Neopor® available from BASF), carbon black or aluminum. A good performance of the athermanous filler and thus of the overall thermal insulation allows a significant reduction in the density of the expanded article or thickness of the same without reducing the overall thermal resistance value.

EP 620,246 A describes a process for preparing granules of expandable polystyrene containing an athermanous material, for example carbon black, distributed on the surface or, alternatively, incorporated inside the particle itself.

The use of carbon black has long been known as a filler or pigment, or else as a nucleating agent (see, for example, Chem. Abstr., 1987, "Carbon Black Containing Polystyrene Beads"). Among the various types of carbon black, the most important are carbon black from oil combustion ("petroleum black")/carbon black from gas combustion, carbon black from acetylene, lamp black, channel black, thermal black and electrically conductive carbon black. WO 1997/45477 describes compositions based on expandable polystyrene comprising a styrene polymer and from 0.05 to 25% of carbon black of the lamp black type.

Depending on the manufacturing process, these carbon blacks have diameters which range from 10 nm to 1,000 nm approximately, and have very different specific surfaces (from 10 to 2,000 $m^2/g$). These differences lead to different blockage capacities of the infrared rays. WO 2006/61571 describes compositions based on expandable polystyrene comprising a styrene polymer and from 0.05 to less than 1% of carbon black, with a surface area ranging from 550 to 1,600 $m^2/g$.

It is known that graphite can also be effectively used as a black body (as described, for example, in JP 63-183941, WO 04/022636, WO 96/34039). Its use as attenuating agent of infrared radiation in polymeric foams is, however, more recent. Patent application JP 63-183941 is among the first to propose the use of some additives, active in blocking infrared rays in wavelengths ranging from 6 to 14 µm, and therefore obtaining thermally insulating thermoplastic resins capable of permanently sustaining a low thermal conductivity. Among all additives, graphite is preferred.

DE 9305431 U describes a method for producing expanded molded products having a density of less than 20 $kg/m^3$ and a reduced thermal conductivity. This result is reached by incorporating an athermanous material, such as graphite and also carbon black, in the rigid polystyrene foam. International patent application WO 98/51735 describes expandable polystyrene particulates containing 0.05 to 25% by weight of synthetic or natural graphite particles, homogeneously distributed in the polystyrene matrix. The graphite preferably has an average diameter ranging from 1 to 50 µm, an apparent density ranging from 100 to 500 g/l and a surface area ranging from 5 to 20 $m^2/g$.

WO 2011/042800 is directed to an expandable thermoplastic nanocomposite polymeric composition, preferably a polystyrene composition, including an athermanous filler comprising nano-scaled graphene sheets having a thickness not greater than 150 nm, an average dimension (length, width, or diameter) not greater than 10 µm and a surface area >50 $m^2/g$.

SUMMARY OF THE INVENTION

There is an ongoing need for highly effective insulation materials having low space requirement and thus allowing manifold fields of use. The problem underlying the present invention is to find a particulate material having exceptionally low thermal radiative conductivity that may be used in combination with conventional materials to improve thermal insulation. More particularly, it is sought for an athermanous filler material for use in polymeric foams and vacuum insulated panels.

We have now found that a particulate carbon material comprising carbon particles in the shape of disks ("carbon disks") and hollow open cones ("carbon cones") can be used for thermal insulation.

DETAILED DESCRIPTION OF THE PREFERRED EMBODIMENT

Figure 1:
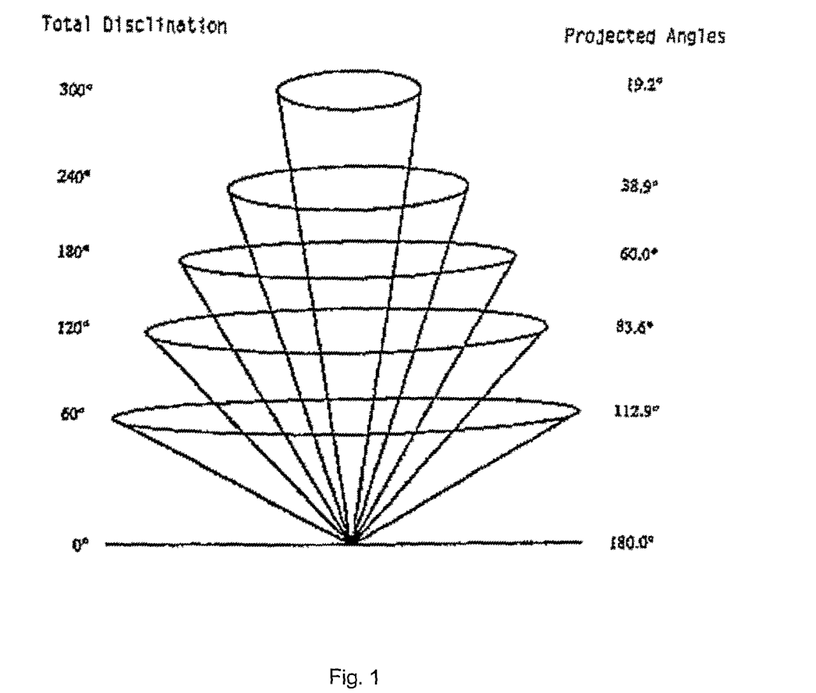
FIG. 1 shows schematically the projected angles (opening or apex angles) of the various possible carbon cones.

The terms "carbon cones" and "carbon disks" are used to designate a certain class of carbon structures in the micro-domain or smaller (nano-domain). These structures can be grossly described as stacks of graphitic sheets with flat or conical structures. The open carbon cones are generally hollow cones each made up of an uninterrupted sheet of graphite, except at their open edges. All cones are closed in the apex and only exist with five different opening angles. A graphitic sheet composed of solely hexagons cannot form a continuous cone cap but forms a flat plate or disk. Pentagons have to be added to form a curved tip. The open carbon cones can be modeled as a wrapped graphitic sheet. In order to have strain-free, seamless wrapping, a sector has to be cut out of the sheet and thereafter the edges have to be connected. By considering the symmetry of a graphite sheet that sector should have an angle (=total disclination TD) of TD=N×60°, where N=0, 1, 2, 3, 4 or 5 and corresponds to the effective number of pentagons necessary to produce the particular total disclination (curvature). Therefore, the opening angles α of the cones only have certain discrete values according to the equation α=2 arcsin(1−N/6). A total disclination of 0° (N=0) corresponds to a flat plate, i.e. the carbon disks can be described as flat circular graphite sheets having pure hexagonal graphite structure. FIG. 1, taken from international application WO 98/42621, shows schematically the projected angles (opening or apex angles) of the various possible carbon cones.

The concept of disclination and projected angle as applied to the carbon cones and disks is best understood with reference to the article "Graphitic Cones and the Nucleation of Curved Carbon Surfaces" appearing in Nature (1997), July 31 issue. As shown in FIG. 1, the projected angles for each of the possible cones are 19.2°, 38.9°, 60°, 83.6° and 112.9°, which correspond to total disclinations of 300° (N=5), 240° (N=4), 180° (N=3), 120° (N=2) and 60° (N=1), respectively. In addition, the flat plate graphitic sheet has a projected angle of 180° and a total disclination of 0°. Electron micrographs of the particulate carbon material confirm the presence of disks and cones having at least one of the possible opening angles mentioned above. Carbon cones having opening angles different from those mentioned have not been observed.

The characteristic size, or longest dimension, of the carbon cones and disks is typically less than 5 µm, preferably less than 4 µm, more preferably no more than 2 µm such as 1 to 2 µm or less than 1 µm or less than 800 nm, and the thickness, measured as the wall thickness of hollow open carbon cones or the thickness of the disks, is typically less than 100 nm, preferably less than 80 nm, more preferably less than 50 nm such as 20 to 30 nm. Typical aspect ratios are within the range of from 1 to 50 clearly distinguishing those micro-domain structures from carbon nanotubes having aspect ratios in the range of from 100 to 1000.

The carbon disks and cones are carbon micro-domain structures that are strongly dominant in the present particulate carbon material. Typically, the particulate carbon material comprises more than 90% by weight of carbon micro-domain structures and up to about 10% by weight of ordinary carbon black. The micro-domain fraction of the particulate material usually comprises at least 10% by weight of carbon cones, preferably about 80% by weight of carbon disks and about 20% by weight of carbon cones. Further micro-domain or nano-domain structures such as nanotubes and fullerenes may also be present, but only in minute amounts.

The present particulate carbon material is produced by the so-called Kvaerner Carbon Black & Hydrogen Process, a plasma torch process, which is fully described in WO 98/42621. The production method can be summarized as a two-stage pyrolysis process where a hydrocarbon feedstock is first led into a plasma zone and thereby subject to a first gentle pyrolysis step where the hydrocarbons are only partially cracked or decomposed to form polycyclic aromatic hydrocarbons (PAHs), before entering the PAHs in a second sufficiently intense plasma zone to complete the decomposition of the hydrocarbons into elementary carbon and hydrogen.

U.S. Pat. No. 6,476,154 is directed to the use of the present particulate micro-domain carbon material in diene-based elastomers to improve the mechanical properties of the rubber compositions. Applications of the rubber compositions include tires, belts and hoses. The thermal radiative conductivity of the particulate carbon material is neither mentioned nor of any relevance for the intended applications referred to in U.S. Pat. No. 6,476,154.

WO 2006/052142 concerns an electricity conductive composite material comprising a by nature non-conductive material which has been made conductive by loading it with an electricity conducting filler consisting of the present particulate carbon material prepared by the Kvaerner Carbon Black & Hydrogen Process. WO 2006/052142 also declares the filler and consequently the composite material thermally conductive but no evidence is provided.

In view of the teaching of WO 2006/052142 to add the particulate carbon material to a non-conductive material to enhance thermal conductivity, it is quite surprising that the particulate carbon material can be used for thermal insulation. It is the merit of the present inventors to have found out that the particulate micro-structured carbon material has an exceptionally high extinction coefficient for infrared radiation which makes it ideal for thermal insulation applications.

The spectral effective specific extinction coefficient $e^*_\Lambda$ at a wavelength in the range of $\Lambda=1.4$ μm to 35 μm is a measure for the attenuation of the thermal radiation transmitting the material. The extinction includes both absorption and scattering processes within the material. The influence of anisotropic scattering on radiative transfer can be enclosed by scaling to the so called effective quantities, marked with a star ($s^*_\Lambda$, $e^*_\Lambda$, and $\omega^*_{0,\Lambda}$). The spectral effective specific extinction coefficient $e^*_\Lambda$ is given by the sum of the spectral effective specific scattering coefficient $s^*_\Lambda$ and spectral absorption coefficient $a_\Lambda$.

$$e^*_\Lambda = s^*_\Lambda + a_\Lambda \, [\text{m}^2/\text{kg}] \tag{1}$$

The reciprocal of the product of the spectral effective extinction coefficient $e^*_\Lambda$ and the density $\rho$ is the mean free path $L_\Lambda$ of thermal radiation in the medium, i. e. the path before scattering or absorption takes place:

$$L_\Lambda = \frac{1}{e^*_\Lambda \cdot \rho} \, [\text{m}] \tag{2}$$

The spectral effective albedo $\omega^*_{0,\Lambda}$ is the quotient of the spectral effective specific scattering coefficient $s^*_\Lambda$ and the spectral effective specific extinction coefficient $e^*_\Lambda$.

$$\varpi^*_{0,\Lambda} = \frac{s^*_\Lambda}{e^*_\Lambda} \, [1] \tag{3}$$

The values of the albedo $\omega^*_0$ can be found between 0 and 1 (0 in the case of only absorption and 1 in the case of only scattering).

A complete description of the infrared-optical properties is given by either the extinction coefficient and the albedo or the scattering and the absorption coefficient. These four values are connected through Eq. (1) and Eq. (3).

In order to describe the total radiative thermal transport through the scattering and absorbing medium the total effective specific extinction coefficient as a function of temperature $e^*(T)$ is obtained by integrating the spectral effective specific extinction coefficient $e^*_\Lambda$ over all wavelengths $\Lambda$ in the range of $\Lambda=1.4$ μm to 35 μm using the Rosseland weight function ($f_R(\Lambda,T)$:

$$\frac{1}{e^*} = \frac{\int_0^\infty \frac{1}{e^*_\Lambda} \cdot f_R(\Lambda, T) \cdot d\lambda}{\int_0^\infty f_R(\Lambda, T) \cdot d\lambda} \, [\text{m}^2/\text{kg}] \tag{4}$$

where the Rosseland function is the partial derivative of the spectral intensity $i_B(\lambda,T)$ emitted by a black body at a given wavelength $\Lambda$ and temperature T with respect to the total intensity $i_B(T)$ at the same temperature:

$$f_R(\Lambda, T) = \frac{\partial i_B(\Lambda, T)}{\partial_B(T)} \, [1/\text{m}] \tag{5}$$

The radiative conductivity can be calculated in dependence on the sample thickness if the total effective specific extinction coefficient is known:

$$\lambda_{rad}(T) = \frac{\frac{16}{3} \cdot \sigma \cdot T^3}{\frac{4}{3 \cdot d} + e^*(T) \cdot \rho} \, [\text{W/m} \cdot \text{K}] \tag{6}$$

where T is the average sample temperature and $\sigma=5.67 \cdot 10^{-8}$ W m$^{-2}$K$^{-4}$ the Stefan-Boltzmann constant.

For optical thick samples (i. e. $e^* \cdot \rho \cdot d \gg 1$) Eq. (6) is reduced to:

$$\lambda_{rad,\infty}(T) = \frac{\frac{16}{3} \cdot \sigma \cdot T^3}{e^*(T) \cdot \rho} \, [\text{W/m} \cdot \text{K}] \tag{7}$$

$\lambda_{rad,\infty}$ does not depend on the sample thickness.

Generally, the total effective specific extinction coefficient $e^*$ for infrared radiation with $\Lambda=1.4$ μm to 35 μm of the present particulate carbon material at 300 K is within the range of from 1200 to 1700 m$^2$/kg, typically within the range of from 1290 to 1640 m$^2$/kg. The parameters to calculate the total effective extinction coefficient $e^*$ of the particulate carbon material were obtained as described in the example.

The infrared extinction of the present particulate micro-structured carbon material is in fact much higher than that of known carbon blacks and graphites used as athermanous fillers hitherto. It is a further fundamental advantage of the present invention that the specific particulate carbon material can be produced in industrial scale in approximately the same magnitudes and production costs as ordinary carbon black.

Due to its unique IR extinction characteristic the present particulate carbon material is useful in any application for thermal insulation either alone or preferably in combination with any other material(s). These materials are typically thermally insulating and include both organic and inorganic thermally insulation materials. Adding the present particulate carbon material to an insulating material significantly reduces the thermal conductivity through the composite and thus improves the insulating effect. Exemplary insulation materials which can be used in combination with the present particulate carbon material are polymeric materials either thermoplastic or thermosetting; wood fiber materials such as wood wool and cork; vegetable or animal fibers such as hemp, flax, wool; mineral and glass wool, foamed glass in plate form; calcium silicate boards and gypsum plasterboards; fumed silica, and mixtures of at least two of these materials. Examples of polymeric materials include vinyl polymers, preferably vinyl aromatic polymers such as polystyrene, copolymers of styrene with at least one copolymerizable monomer, and polypropylene; as well as polyurethanes. Blends of various polymers can also be used. The thermally insulating polymeric materials including those mentioned above are typically present in the form of a foam either open- or closed-cell. Polymeric foams to be used together with the present particulate carbon material include for example expanded polystyrene (EPS), expanded copolymers of styrene and at least one copolymerizable monomer, expanded polypropylene, extruded polystyrene (XPS), and polyurethane foam. In some embodiments the polymeric foam comprises 1 to 10% by weight, preferably 1.5 to 8% by weight, more preferably 2 to 6% by weight of the present particulate carbon material, each based on the weight of the polymeric material.

Typically, the present particulate carbon material is used as an athermanous filler which is included/incorporated into a matrix material which is preferably a polymeric foam as mentioned above. In some embodiments the particulate carbon material is used as an athermanous filler (e.g. in a matrix material which is preferably a polymeric foam as mentioned above) together with at least one further filler material which may be thermally insulating or not. Examples of filler materials for use together with the present particulate carbon material include fumed silicas such as Aerosil® R 812 (hydrophobic fumed silica aftertreated with hexamethyldisilazane and available from Evonik Industries AG, Germany). It is well known to the person skilled in the art how to incorporate an athermanous filler into a polymeric foam and various methods are described in the literature, for example in WO 2011/042800 disclosing several methods for preparing expanded and expanded extruded sheets of a thermoplastic polymer, preferably polystyrene, loaded with an athermanous filler.

Moreover, the present particulate carbon material can be used in vacuum insulated panel (VIPs) to further reduce the thermal conductivity. It can be added to the material used as the supporting core, preferably it is incorporated into the porous core material. Materials that may be employed for the core in combination with the present particulate carbon material include open-cell polymer foams such as polyurethane foams, microfibre materials, fumed silica and perlite.

Another application wherein the present particulate carbon material can be used alone or in combination with another thermally insulating material is as a fill for the insulation of high temperature furnaces.

EXAMPLES

Figure 2:
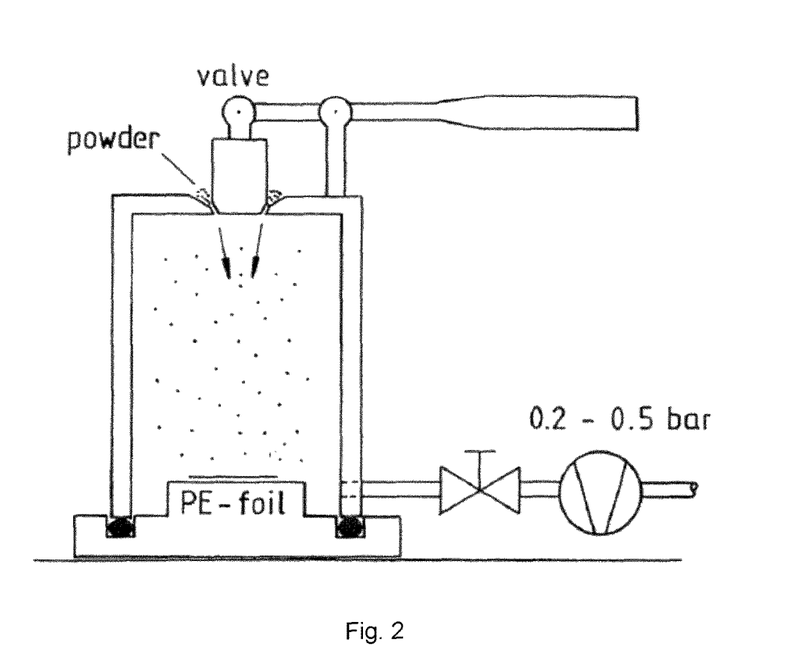
FIG. 2 shows the vacuum powder dispersing system GALAI PD 10; powder grains placed within the well at the top of the evacuated vessel are sucked into the opening and settle onto the PE foil.

Some embodiments of the present invention will now be described in detail in the following examples.
Materials:
All carbon black powders are commercially available from Orion Engineered Carbons GmbH, Hanau, Germany.
Ex. No. Description
IE1 particulate carbon material comprising disks and cones[1]
IE2 expanded polystyrene foam comprising 3 wt. % of IE1[2]
IE3 expanded polystyrene foam comprising 5 wt. % of IE1[2]
CE4* nature graphite powder[3]
* comparative example
[1] prepared by the Kvaerner Carbon Black & Hydrogen Process as described in WO 98/42621
[2] wt. % based on the weight of polystyrene
[3] available from Canada Carbon, Canada The powder specimen (inventive example) and the 2 foams (inventive examples 2 and 3) were investigated to obtain the total effective specific extinction coefficient e* at ambient temperature (300 K).
Measurements:

The samples were measured using a Bruker Fourier Transform Infrared (FTIR) spectrometer Vertex 70v in the wavelength range from 1.4 µm to 35 µm which is decisive for the radiative thermal transport at ambient temperature. For measuring the spectral directional-hemispherical transmittance and reflectance, thin films of powder specimen were spread onto supporting PE layers, which are transparent in the infrared wavelength range. Thin powder layers are sprayed onto the PE layer using a vacuum gage. The preparation of homogeneous thin films is performed with the commercial powder disperging system GALAI PD 10. A strong air inflow into an evacuated chamber transforms the powder into a disagglomerated, partially electrically charged dust, which slowly settles onto the support foil and forms a reasonably stable specimen. FIG. 2 depicts the vacuum powder disperging system GALAI PD 10; powder grains placed within the well at the top of the evacuated vessel are sucked into the opening and settle onto the PE foil. Powder layer thickness between 30 µm and 500 µm can be achieved by varying the quantity of powder.

For measuring the spectral directional-hemispherical transmittance and reflectance of the foams several layers of each foam specimen were stamped out from the foam board. The diameter of the layers is 16 mm.

Figure 3:
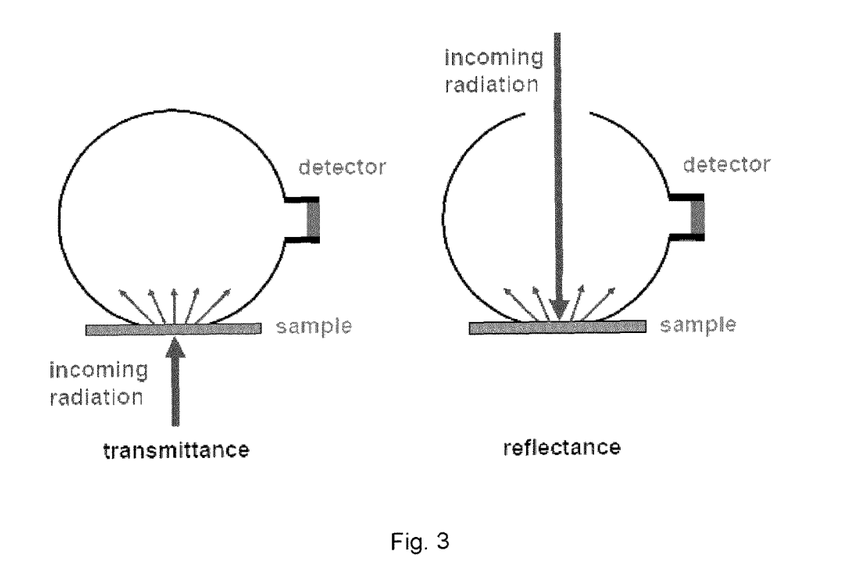
FIG. 3 shows the configurations of the integrating sphere for determining the directional-hemispherical transmittance $T_{dh}$ (on the left side) and reflectance $R_{dh}$ (on the right side) at ambient temperature normal to the surface.

The samples are then placed in the opening of an integrating sphere which is coupled to the spectrometer. FIG. 3 shows the configurations of the integrating sphere for determining the directional-hemispherical transmittance $T_{dh}$ (on the left side) and reflectance $R_{dh}$ (on the right side) at ambient temperature normal to the surface. The sample is irradiated normal to the surface and the radiation reflected into the front side hemisphere or transmitted into the rear side hemisphere is measured for the transmittance or reflectance spectra, respectively. Several samples with different thicknesses were measured in order to consider eventual inhomogenities in the specimen and to guarantee a sufficiently good average measurement value. For calculating the spectral effective specific extinction coefficient $e^*_\Lambda$ the mass per area m" of each sample was also determined.

From the spectral directional-hemispherical transmittance and reflectance the spectral effective specific extinction coefficient $e^*_\Lambda$ and the spectral effective albedo $\omega^*_\Lambda$ of each specimen was calculated using a certain solution of the equation of radiative transfer, the so called three-flux solution. The three-flux solution allows to quantity the radiative transfer through scattering and absorbing media as well as to determine the spectral scattering and absorption coefficients of the investigated specimens.

Figure 4:
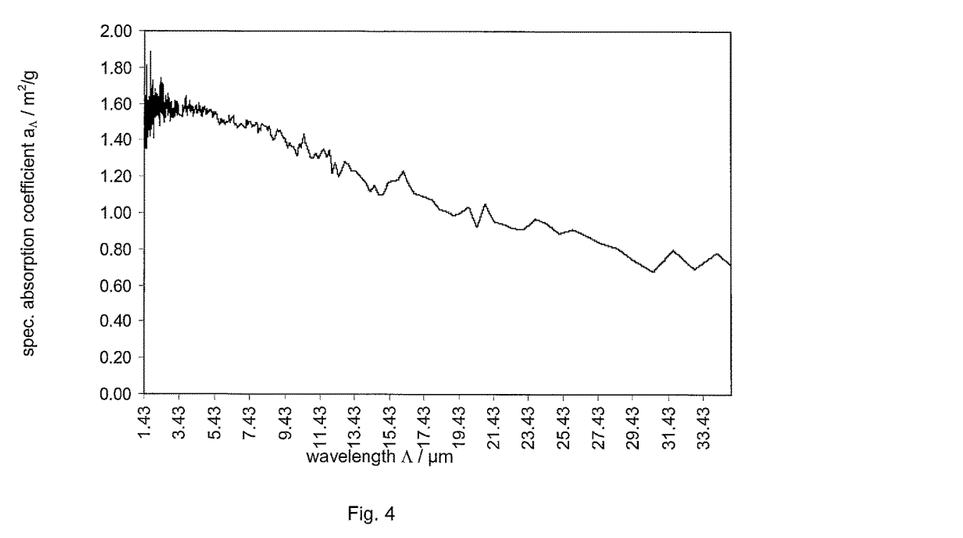
FIG. 4 shows the spectral specific absorption coefficient $a_\Lambda$ of the particulate carbon material comprising disks and cones (IE1) in dependence on the wavelength $\Lambda$ from 1.4 to 35 µm.

FIG. 4 shows the spectral specific absorption coefficient $a_\Lambda$ of the particulate carbon material comprising disks and cones (IE1) in dependence on the wavelength $\Lambda$ from 1.4 to 35 µm.

Figure 5:
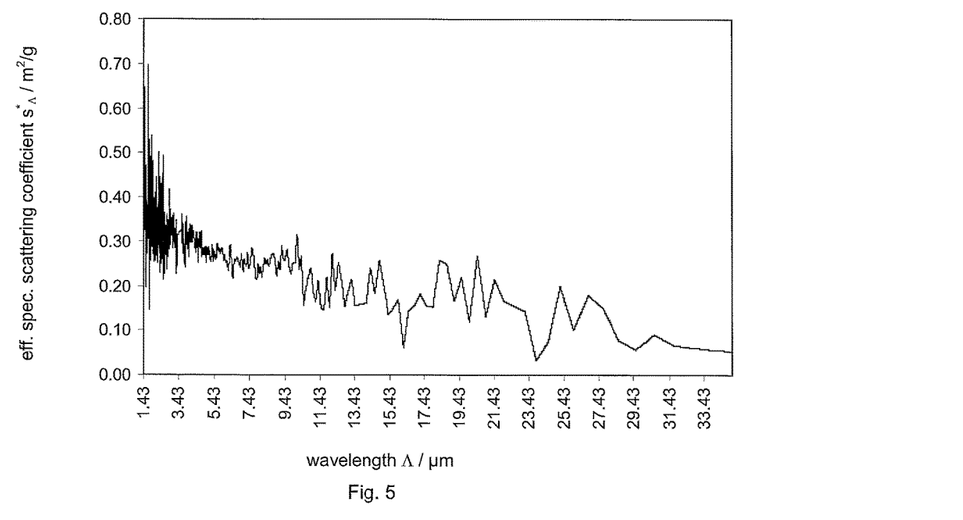
FIG. 5 shows the spectral effective specific scattering coefficient $s^*_\Lambda$ of the particulate carbon material comprising disks and cones (IE1) in dependence on the wavelength $\Lambda$ from 1.4 to 35 µm.

FIG. 5 shows the spectral effective specific scattering coefficient $s^*_\Lambda$ of the particulate carbon material comprising disks and cones (IE1) in dependence on the wavelength $\Lambda$ from 1.4 to 35 µm.

Figure 6:
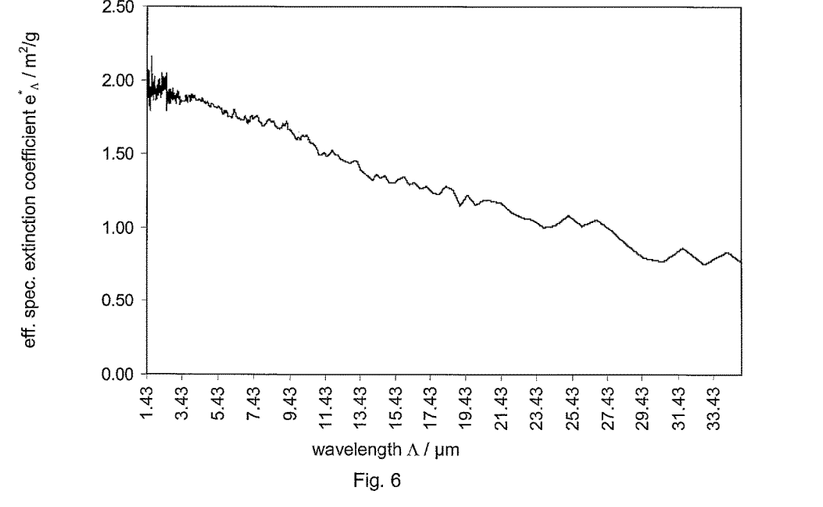
FIG. 6 shows the spectral effective specific extinction coefficient $e^*_\Lambda$ of the particulate carbon material comprising disks and cones (IE1) in dependence on the wavelength $\Lambda$ from 1.4 to 35 µm.

FIG. 6 shows the spectral effective specific extinction coefficient $e^*_\Lambda$ of the particulate carbon material comprising disks and cones (IE1) in dependence on the wavelength $\Lambda$ from 1.4 to 35 µm.

Figure 7:
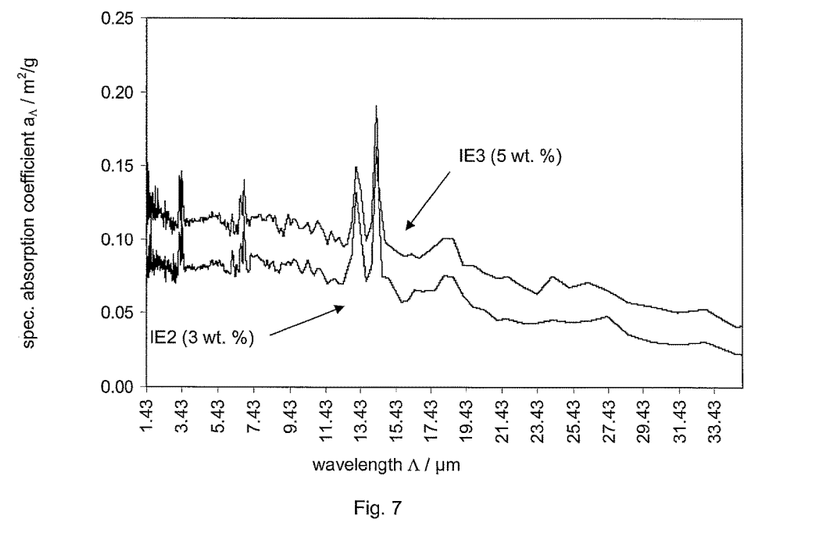
FIG. 7 shows the spectral specific absorption coefficient $a_\Lambda$ of IE2 (expanded polystyrene foam comprising 3 wt. % of IE1) and IE3 (expanded polystyrene foam comprising 5 wt. % of IE1) in dependence on the wavelength $\Lambda$ from 1.4 to 35 µm.

FIG. 7 shows the spectral specific absorption coefficient $a_\Lambda$ of IE2 (expanded polystyrene foam comprising 3 wt. % of IE1) and IE3 (expanded polystyrene foam comprising 5 wt. % of IE1) in dependence on the wavelength Λ from 1.4 to 35 μm.

Figure 8:
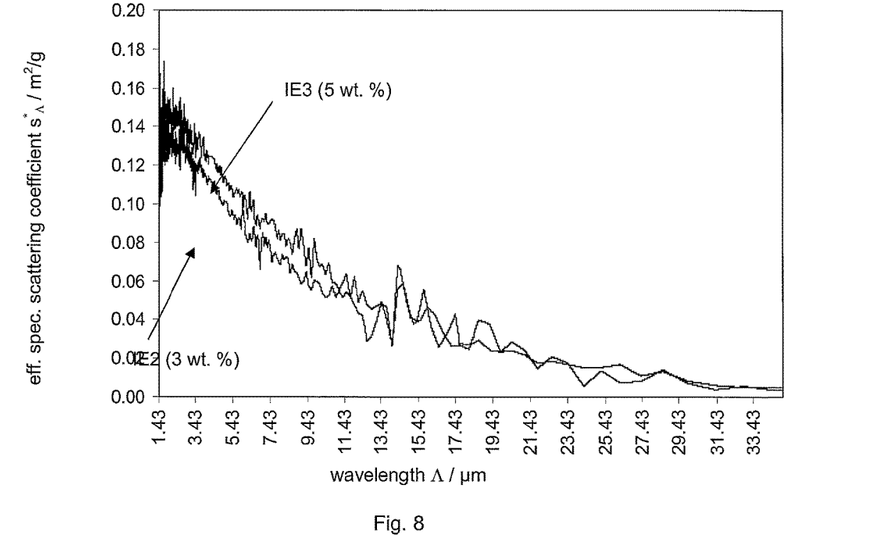
FIG. 8 shows the spectral effective specific scattering coefficient $s^*_\Lambda$ of IE2 (expanded polystyrene foam comprising 3 wt. % of IE1) and IE3 (expanded polystyrene foam comprising 5 wt. % of IE1) in dependence on the wavelength $\Lambda$ from 1.4 to 35 µm.

FIG. 8 shows the spectral effective specific scattering coefficient $s^*_\Lambda$ of IE2 (expanded polystyrene foam comprising 3 wt. % of IE1) and IE3 (expanded polystyrene foam comprising 5 wt. % of IE1) in dependence on the wavelength Λ from 1.4 to 35 μm.

Figure 9:
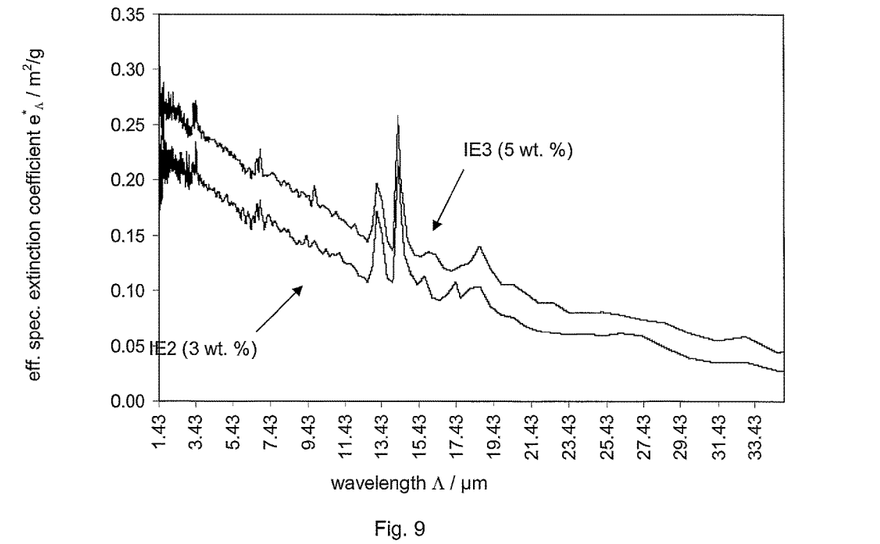
FIG. 9 shows the spectral effective specific extinction coefficient $e^*_\Lambda$ of IE2 (expanded polystyrene foam comprising 3 wt. % of IE1) and IE3 (expanded polystyrene foam comprising 5 wt. % of IE1) in dependence on the wavelength $\Lambda$ from 1.4 to 35 µm.

FIG. 9 shows the spectral effective specific extinction coefficient $e^*_\Lambda$ of IE2 (expanded polystyrene foam comprising 3 wt. % of IE1) and IE3 (expanded polystyrene foam comprising 5 wt. % of IE1) in dependence on the wavelength Λ from 1.4 to 35 μm.

From the spectral effective specific extinction coefficient $e^*_\Lambda$ in the wavelength range between 1.4 μm and 35 μm the total effective specific extinction coefficient at ambient temperature is calculated according to the equations in the description of the present application.

Results:

In Table 1 the total effective specific extinction coefficient $e^*$ of the investigated specimens at a temperature of 300 K is reported. The total effective specific extinction coefficient $e^*$, calculated from Eq. (4), can be determined with an accuracy of about 10% to 15%.

TABLE 1

Total effective specific extinction coefficient e*

| Example No. | Short Description | e*/m²/kg at T = 300 K |
|---|---|---|
| IE1 | carbon disks and cones | 1466 ± 176 |
| IE2 | EPS foam 3% IE1 | 116 ± 14 |
| IE3 | EPS foam 5% IE1 | 152 ± 18 |
| CE4* | nature graphite powder | 292 ± 35 |

In Table 2 the total effective specific extinction coefficient $e^*$, the radiative conductivity $\lambda_{rad,\infty}$ calculated according to Eq. (7) and the foam density ρ of the investigated foams IE2 and IE3 at a temperature T=300 K are shown.

TABLE 2

Properties of the Foam Samples

| Ex. No. | Description | e*/m²/kg at T = 300 K | $\lambda_{rad,\infty}$ (T) mW/(m · K) at T = 300 K | ρ/kg/m³ |
|---|---|---|---|---|
| IE2 | EPS foam 3% IE1 | 116 ± 14 | 4.4 | 16 |
| IE3 | EPS foam 5% IE1 | 152 ± 18 | 3.4 | 16 |

It is evident from the results shown in Table 1 that the particulate micro-domain carbon material comprising carbon disks and cones (IE1) has a significantly higher total effective specific extinction coefficient e* than that of graphite used as athermanous fillers hitherto. It is further quite interesting to see from Table 2 that the EPS foams loaded with the present particulate carbon material have exceptionally low thermal conductivities that are in a range normally reached with vacuum insulated panels. This is especially remarkable since these low conductivities are attained in EPS foams with relatively low densities of about 16 kg/m³. Unloaded EPS foams used for insulation purposes must have densities of at least 30 kg/m³ because lower densities cause a drastic increase in thermal conductivity.

What is claimed is:

1. A method of reducing thermal conductivity, comprising:
preparing a composite by adding a particulate carbon material comprising carbon particles to an insulation material,
wherein the carbon particles have a shape of disks and hollow open cones.

2. The method of claim 1, wherein each of the hollow open cones has an opening angle selected from the group consisting of 19.2°, 38.9°, 60°, 83.6° and 112°.

3. The method of claim 1, wherein a thickness of the disks and a thickness of walls of the hollow open cones are less than 100 nm respectively.

4. The method of claim 1, wherein longest dimensions of the disks and the hollow open cones are less than 5 μm respectively.

5. The method of claim 1, wherein the particulate carbon material has a total effective specific extinction coefficient e* for IR radiation with Λ=1.4 μm to 35 μm at 300 K within a range of from 1200 to 1700 m²/kg.

6. The method of claim 1, wherein the particulate carbon material is used as an athermanous filler.

7. The method of claim 6, wherein the particulate carbon material is incorporated in a matrix made of the insulating material which is a polymeric material.

8. The method of claim 7, wherein the polymeric material is a polymer selected from the group consisting of vinyl polymers and polyurethanes.

9. The method of claim 7, wherein the matrix made of the insulating material is a polymeric foam.

10. The method of claim 9, wherein the polymeric foam comprises a thermoplastic or a thermosetting polymer.

11. The method of claim 10, wherein the polymeric foam comprises at least one selected from the group consisting of expanded polystyrene, an expanded copolymer of styrene and at least one copolymerizable monomer, expanded polypropylene, extruded polystyrene, and polyurethane foam.

12. The method of claim 7, wherein the polymeric material is a vinyl aromatic polymer.

13. The method of claim 1, wherein the insulation material comprises fumed silica.

14. A method of reducing a thermal conductivity of a vacuum insulated panel (VIP) by adding a particulate carbon material comprising carbon particles in a shape of disks and hollow open cones to an insulation material used as a supporting core.

* * * * *